Feb. 13, 1934.                J. D. VIRUETTE                1,946,651
DEVICE FOR REMOVING A MEASURED QUANTITY OF CREAM FROM A BOTTLE
Original Filed April 24, 1928
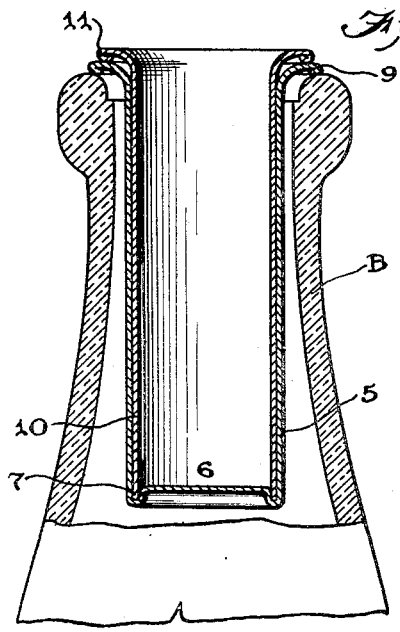
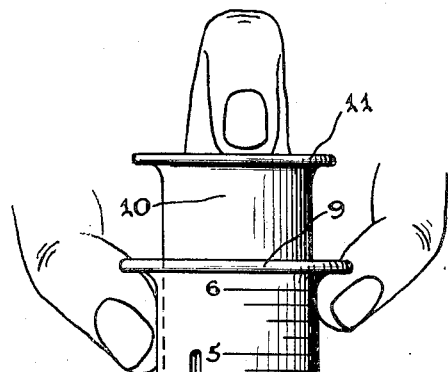
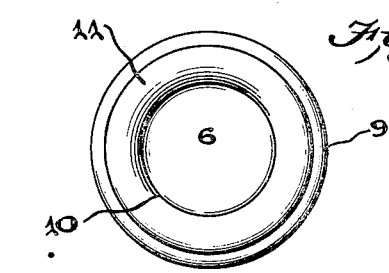
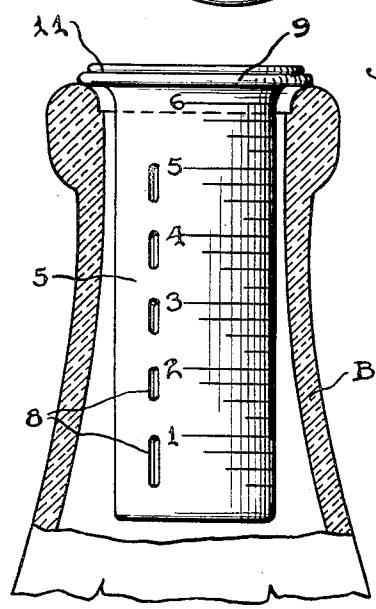
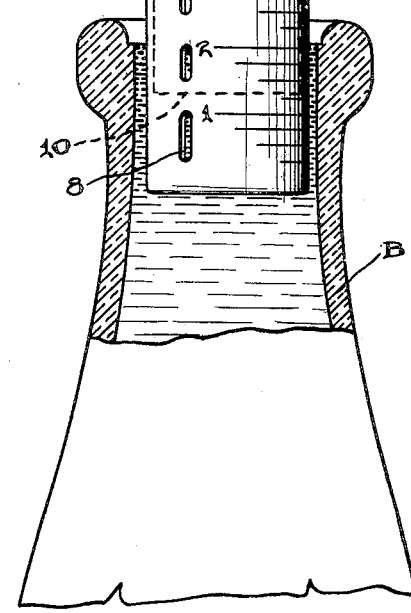
Inventor,
Joseph D. Viruette,
By Sterling P. Buck
Attorney.

Patented Feb. 13, 1934

1,946,651

UNITED STATES PATENT OFFICE 1,946,651

DEVICE FOR REMOVING A MEASURED QUANTITY OF CREAM FROM A BOTTLE

Joseph D. Viruette, Schenectady, N. Y., assignor of one-half to Edward T. Leary, Schenectady, N. Y., and one-fourth to Bettina De Angelo, Oneonta, N. Y.

Refiled for abandoned application Serial No. 272,557, April 24, 1928. This application August 1, 1932. Serial No. 627,212

1 Claim. (Cl. 210—51.5)

This invention relates to measuring devices, and more particularly to an improved device for removing a measured quantity of cream from a bottle. Reference is made to my forfeited application No. 272,557, allowed April 17, 1931.

The main object of this invention is to provide an improved device of this character which comprises the minimum number of separately formed parts, which is exceedingly convenient and accurate in use and operation, and which has all parts easily accessible for washing and sterilizing.

Other objects and important features are pointed out or implied in the following details of description, in connection with the accompanying drawing in which:

Fig. 1 is a central vertical sectional view of the top part of a milk bottle, and of my improved cream remover in place as a closure for the milk bottle which may be partly empty.

Fig. 2 is a view similar to Fig. 1, but showing the device in full side elevation.

Fig. 3 is a view showing the device in use, that is, being lowered into the bottle preparatory to receiving and removing a measured quantity of the contents of the bottle.

Fig. 4 is a top plan view of the device which constitutes my invention.

Referring to the drawing in detail, in which similar reference characters correspond to similar parts in the several views, and in which the milk bottle B is shown merely to illustrate one of the applications of my invention, the device will now be described in detail as follows:

A relatively deep and narrow cylinder or tubular member 5 has a bottom 6 which includes a marginal groove around its periphery, as indicated at 7. One or more openings 8 are formed in the vertical wall of the member 5, and the same is provided with graduations extending approximately from the top to the bottom thereof. The respective graduations are combined with horizontally opposite numerals and fractional indications representing units and fractions of a unit of liquid measure, for instance, ¼, ½, ¾, etc., of a tablespoonfull, and 1, 2, 3, 4, 5 and 6 tablespoonfulls, as shown in the drawing. The upper end of the member 5 is outwardly flared to provide an annular flange 9 which is larger than the internal diameter of an ordinary milk bottle's mouth, and preferably large enough to rest snugly upon the uppermost part of the milk bottle, as shown in Figs. 1 and 2. This part 9 also forms a hand-hold which may be grasped between a thumb and finger and firmly held thereby.

A separately formed unit 10 constitutes a tubular or cylindrical gate which is open at both ends, its lower end being adapted to fit snugly in the annular groove 7, while the main part of the convex surface fits slidingly against the inner concave surface of the member 5. The upper part of the member 10 is also outwardly flared and forms an annular flange 11 which rests on or slightly above the flange 9 when its lower end is seated in the groove 7. This flange 9 forms a hand-hold which can be grasped for lifting the member 10 from the member 5, or elevating it to any desired position therein.

Referring to Fig. 3, it will be seen that the bottom of the member 10 is raised above the lowermost opening 8, and a small quantity of cream can enter the member 5 through this opening 8 and rise to the desired level. Of course this level can be determined by the level of cream or milk in the bottle, for the same level will obtain in the measuring device; however, if a relatively large quantity of cream or milk is desired, the part 10 is raised higher, so more of the openings 8 are opened, and the device will receive its desired quantity more quickly. Now, when the desired quantity has been obtained in the device, the part 10 is pushed down against the slight frictional resistance which is sufficient to support its weight, and when its lower edge passes into the groove 7, having closed all the openings 8, it will be seen that the milk or cream cannot leak out of the device when it is raised out of the milk bottle with its measured quantity of milk or cream.

When the user has poured the measured milk or cream into the vessel in which it is to be mixed with other ingredients, the device can be placed again in the milk bottle, for closing the latter, and to avoid getting milk or cream smeared upon the table on which the food is being prepared.

When it is desired to cleanse the device, after using it, the two primarily separate parts are separated from one another, so that the entire inner surface of the member 5 and the entire inner and outer surfaces of the member 10 are fully accessible to the action of boiling water or other fluid to be used in cleansing or sterilizing the device.

Although I have described this embodiment of this invention quite specifically, it is not my intention to limit my patent-protection to these exact details of construction and arrangement of parts, for I claim protection on all modifications which are within the limits of the inventive ideas herein implied and claimed.

What I claim as my invention is:

In a device for removing a measured quantity of liquid from a bottle, the combination of two separately formed units; one of said units comprising an outer cup having a bottom formed with an annular groove around its margin, the upright wall of the outer cup having an opening therethrough at a point near its bottom; the second one of said units being tubular and open at its top and bottom and slidable upward and downward while having an imperforate wall snugly fitting against the inner surface of said outer cup so as to open and close the opening and to have its lower end seated snugly in said annular groove, for the purpose specified.

JOSEPH D. VIRUETTE.